United States Patent [19]
McCracken et al.

[11] Patent Number: 5,636,924
[45] Date of Patent: Jun. 10, 1997

[54] PURGE APPARATUS FOR INTEGRATED CIRCUIT TEST SYSTEM

[75] Inventors: Samuel E. McCracken, Chandler; Leonard Ticey, Gilbert, both of Ariz.

[73] Assignee: VLSI Technology, Inc., San Jose, Calif.

[21] Appl. No.: 542,089

[22] Filed: Oct. 12, 1995

[51] Int. Cl.⁶ .................................................. G01N 25/00
[52] U.S. Cl. ................................................. 374/57; 73/865.6
[58] Field of Search ................................ 374/57; 62/127, 62/130; 73/865.6

[56] References Cited

U.S. PATENT DOCUMENTS

| 5,193,910 | 3/1993 | Kinoshita | 374/57 |
| 5,318,361 | 6/1994 | Chase et al. | 374/57 |

FOREIGN PATENT DOCUMENTS

| 403195945 | 8/1991 | Japan | 374/57 |
| 403248036 | 11/1991 | Japan | 374/57 |

*Primary Examiner*—Diego F. F. Gutierrez
*Attorney, Agent, or Firm*—LaValle Ptak

[57] ABSTRACT

A purge head is provided for use with an integrated circuit test system to direct purge gases, such as nitrogen, to a circuit board on which a device under test is mounted while the device is subjected to below freezing temperatures. The purge head fits into the inner ring or aperture of the product load board to dispense the purge gases directly onto the circuit board on which the device under test is mounted to prevent moisture buildup during cold testing of the device under test.

9 Claims, 3 Drawing Sheets

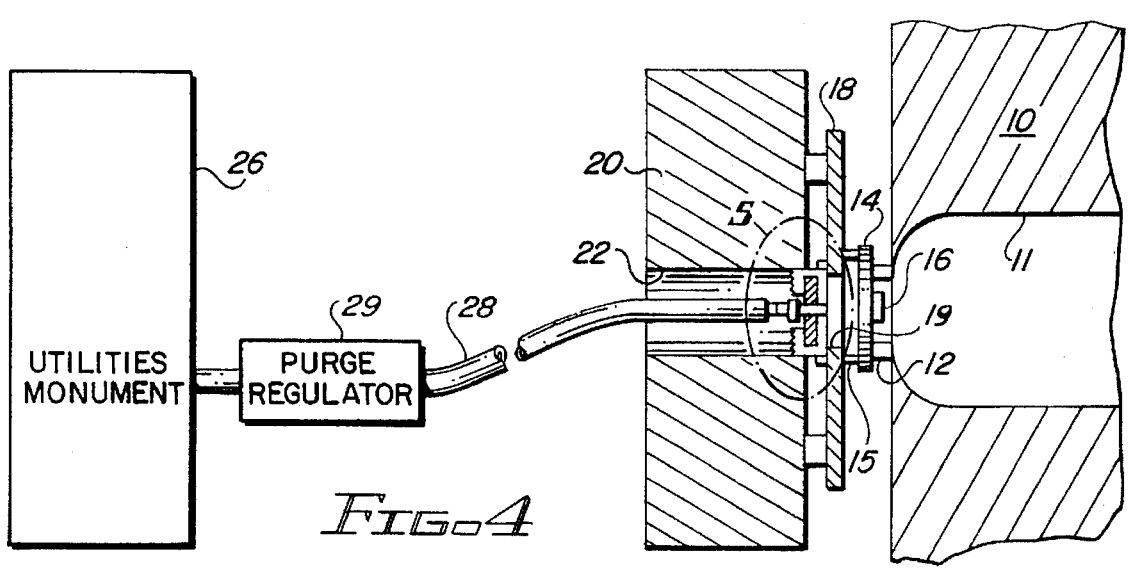
Fig. 4
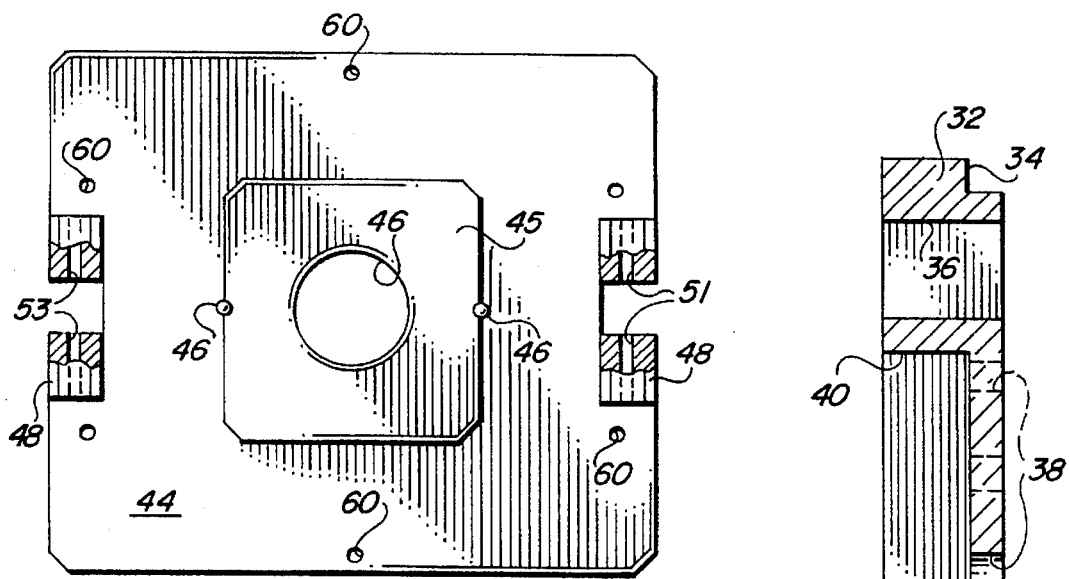
Fig. 6
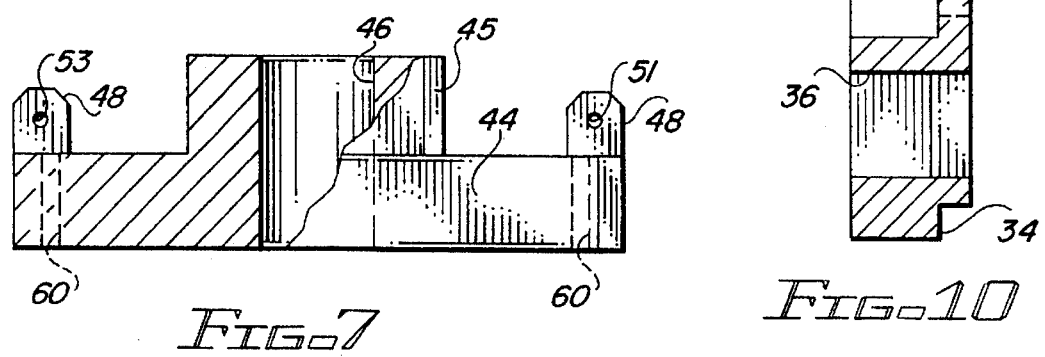
Fig. 7
Fig. 10

PURGE APPARATUS FOR INTEGRATED CIRCUIT TEST SYSTEM

BACKGROUND

Integrated circuits, such as large scale integrated circuits and very large scale integrated circuits typically are tested under various conditions prior to the marketing and incorporating of such circuits into expensive electronic systems. To accomplish the testing, the integrated circuit device under test (DUT) is mounted on a circuit board, which in turn is mounted on and electrically interconnected with a product load board connected to a tester. Signals from the tester are applied through the load board to the circuit board on which the DUT is located to operate the DUT for the purpose of determining whether the various circuits of the DUT are functioning properly.

For some integrated circuit devices, the operating environment in which the device ultimately will be used may be subject to extreme temperatures, either very hot or very cold. Some fabrication defects or operation failures are manifested at only one or both of these extremes; so that it is necessary to test the operation of such devices at the temperature extremes which may be encountered in the subsequent utilization of the devices.

To test integrated circuit devices at cold temperatures, a freezer chamber which has an opening in a side wall with a collar around the opening is employed. The circuit board on which the DUT is mounted is firmly placed against the collar of the freezer to place the DUT in the interior freezer environment. The temperature of such a freezer for cold testing of integrated circuit devices may be −40° C. to −57° C. The opposite side of the circuit board on which the DUT is mounted, as well as the load board and the rest of the test apparatus, is located outside the freezer chamber, and, consequently, is exposed to significantly higher ambient temperatures. The interface between the below freezing temperatures applied to the DUT on the circuit board and ambient room temperatures on the other side of the circuit board frequently causes moisture condensation on the circuit board, as a result of the humidity in the ambient air in the test room. Obviously, moisture buildup can cause device test failures, since the moisture creates short circuits in the various circuit interconnections on the circuit board and between the circuit board and the load board of the test apparatus.

In the past, efforts have been made to direct a drying purge of nitrogen or other suitable gas through the inner ring or central opening of the load board onto the circuit board on which the DUT is mounted. Typically, a hose from a suitable utility monument for supplying the nitrogen purge is held in place in the test head by a foam wadding, with the expectation that the nitrogen then will pass through the test head, the ring or central opening in the load board, and from there onto the circuit board. If the hose is not accurately positioned in the center of the test head, however, the purge gases may be unequally applied to the circuit board of the DUT, and result in only drying of a part of the circuit board. Thus, device test failures and down time still are incurred. Even for a set up which operates acceptably for a period of time, misalignment through jarring of the hose carrying the purge gases or other parts of the apparatus, subsequently may lead to failure of a complete purge of the circuit board.

It is desirable to provide a purge director apparatus which directs the purge gases through the load board in an efficient and controlled manner to overcome the disadvantages of the prior art.

SUMMARY OF THE INVENTION

It is an object of this invention to provide an improved purge apparatus for use with an integrated circuit test system.

It is another object of this invention to provide an improved purge director for use with an integrated circuit test system.

It is still another object of this invention to provide an improved purge director system for directing drying gases onto a circuit board for an integrated circuit device undergoing cold testing.

It is a further object of this invention to provide an improved easy to use, accurate and effective purge directing system for inhibiting moisture buildup on the circuit board of an integrated circuit board device undergoing cold testing.

In accordance with a preferred embodiment of this invention, an integrated test system includes a load board with an aperture through it underlying a circuit board on which an integrated circuit device under test is mounted. The device under test (DUT) is subjected to cold temperatures, which may create buildup of moisture on the circuit board on which the DUT is mounted. A purge head is dimensioned to fit in the aperture in the load board on the side opposite the side on which the circuit board is mounted. The purge head has at least one hole through it to direct purge gases onto the circuit board. Releasable fasteners releasably secure the purge board in the aperture; and a hollow connector on the purge head is coupled with the hole through the purge head to direct purge gases supplied to the hollow connector through the hole to the circuit board.

BRIEF DESCRIPTION OF THE DRAWINGS

FIG. 4 is a cross-sectional view of the apparatus of FIG. 1 modified to incorporate a preferred embodiment of the invention;

FIG. 6 is a top view of a portion of the apparatus shown in FIG. 5;

FIG. 7 is a cross-sectional view of the portion shown in FIG. 6;

FIG. 10 is a cross-sectional view taken along the line 10—10 of FIG. 8.

DETAILED DESCRIPTION

Figure 1:
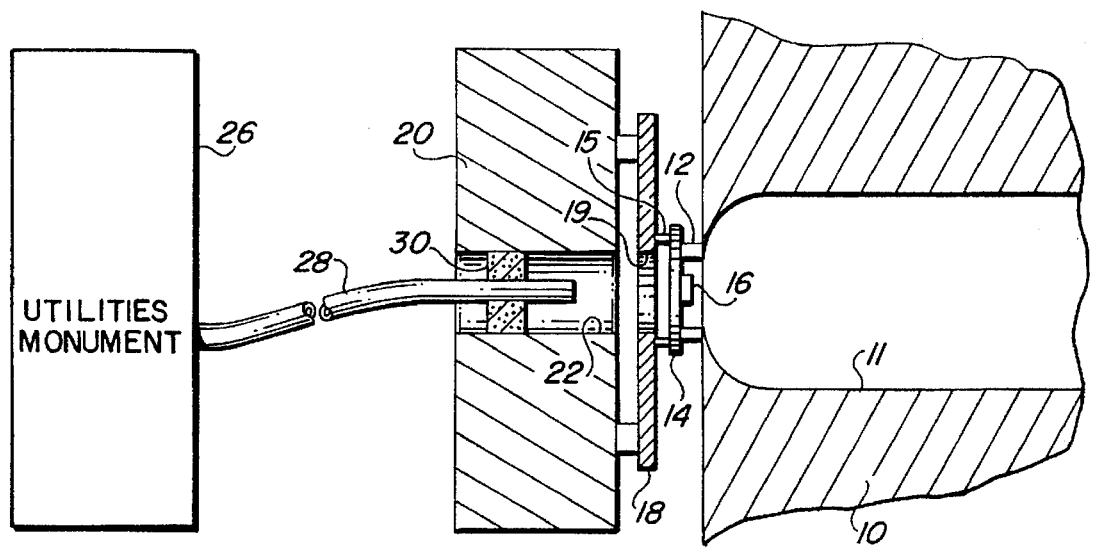
FIG. 1 is a cross-sectional view of a prior art apparatus.

Reference now should be made to the drawings, in which the same reference numbers are used throughout the different figures to designate the same components. FIG. 1 is a cross-sectional view of a portion of a prior art test apparatus used in the cold testing of integrated circuit devices under test (DUT).

Figure 3:
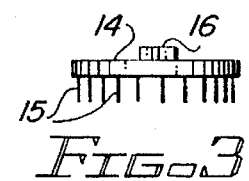
FIG. 3 is a side view of a portion of the apparatus shown in FIG. 1.
Figure 2:
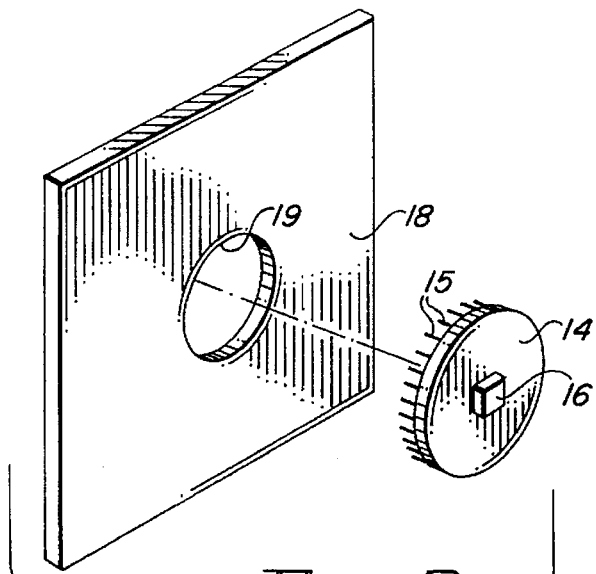
FIG. 2 is an exploded view of a portion of the apparatus shown in FIG. 1 illustrating details thereof.

As shown in FIG. 1, a freezer 10, which may be of any suitable type, has an interior freezer chamber 11 which is capable of being cooled to the temperatures desired for effecting cold testing of an integrated circuit device 16. Such temperatures typically are considerably below freezing, in the range of −40° C. to −57° C. for example. As illustrated in FIG. 1, the left-hand end of the freezer chamber 11 in the freezer 10 is open, with a relatively small circular opening surrounded by a resilient collar 12. When an integrated circuit device is to be tested, the DUT 16 is mounted on a test circuit board 14, which may be a circular board, as illustrated in FIGS. 2 and 3. The circuit board 14 then, in turn, is attached by means of pin connectors 15 to a variety of circuit connections (not shown) on a test circuit load board 18 surrounding a circular aperture or inner ring 19 on the load board 18. This type of configuration, as illustrated most clearly in FIGS. 2 and 3, is commonly used for test circuit load boards.

The load board 18 then is mounted on a test head 20 of a suitable integrated circuit tester. The test head 20 of such a tester typically includes a cylindrical aperture or opening 22 through it, which is aligned with the opening 19 in the load board 18. The assembly of the test head 20, load board 18, circuit board 14, and DUT 16 then is pressed against the collar 12, as illustrated in FIG. 1. As a result, the DUT 16 is subjected to the below freezing temperatures in the chamber 11 while the remainder of the apparatus outside the collar 12 is subjected to the ambient room temperature in which the tests normally are run. Because the circuit board 14 is subjected to significant temperature differentials, moisture buildup frequently occurs on the side of the circuit board opposite the side on which the DUT 16 is mounted. This moisture buildup can cause shorting between the various contacts 15, as well as on printed circuits on either or both the load board 18 and the circuit board 14.

In the past, efforts to purge or eliminate the moisture buildup which may occur in the cold testing of a DUT 16 have included applying a purge gas, such as nitrogen, from a utilities monument 26 through a flexible plastic hose 28. The hose 28 passes through a hole in a cylindrical piece of foam wadding 30 or the like, which then is wedged in the hole 22 in the test head, as illustrated in FIG. 1. The purging gas then exits from the right-hand end of the hose 28 and is directed through the hole 19 in the load board to the left-hand side of the circuit board 14, as illustrated in FIG. 1. As explained above, however, this prior art arrangement is not reliable; and moisture buildup still may occur, invalidating the test run when moisture buildup takes place. It then is necessary to shut the system down, remove the moisture re-align the hose 28, and adjust the amount of purge gas passing through the hose before restarting additional test cycles.

Figure 5:
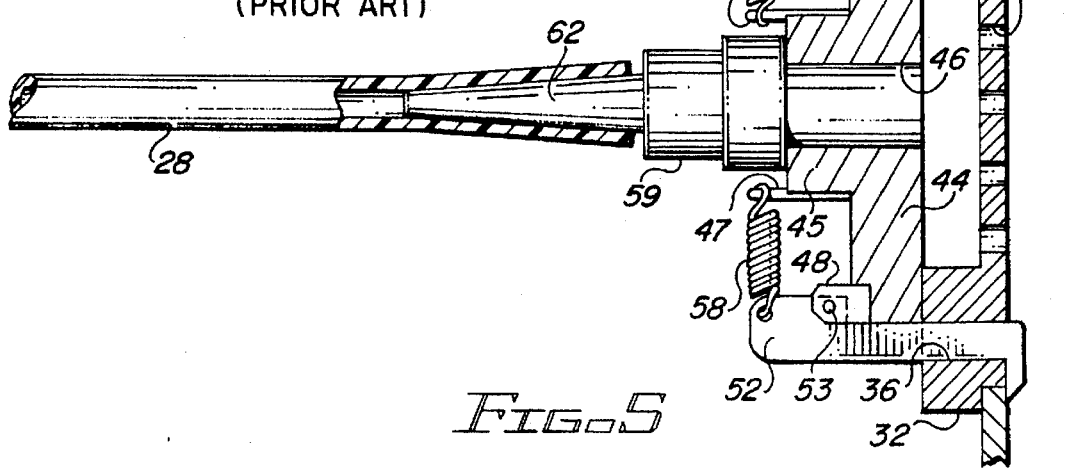
FIG. 5 is an enlarged detail of the portion circled as "5" in FIG. 4.

To overcome the problem of the device shown in FIG. 1, the apparatus of FIG. 1 has been modified in accordance with the preferred embodiment of the invention, as shown in FIGS. 4 and 5. The test apparatus, including the test head 20, load board circuit board 14, freezer 10 and the manner in which the DUT 16 is placed within the cold temperature of the chamber 11 of the freezer is the same for the preferred embodiment of FIG. 4 as for the prior art device of FIG. 1. In place of the flexible hose 28 and the wadding 30 to deliver nitrogen to the general region of the left-hand side of the circuit board 14, opposite the side on which the DUT 16 is mounted, a purge head of the type shown in enlarged detail in FIG. 5 is employed. The purge head fits into the inner ring or aperture 19 of the load board 18. The head has a circular portion 32 with a circular configuration, and with a stepped shoulder 34 on; so that part of the portion 32 overlies the aperture 19 in the load board 18. Another part of the portion 32 extends into the aperture 19, as illustrated most clearly in FIG. 5.

Figure 8:
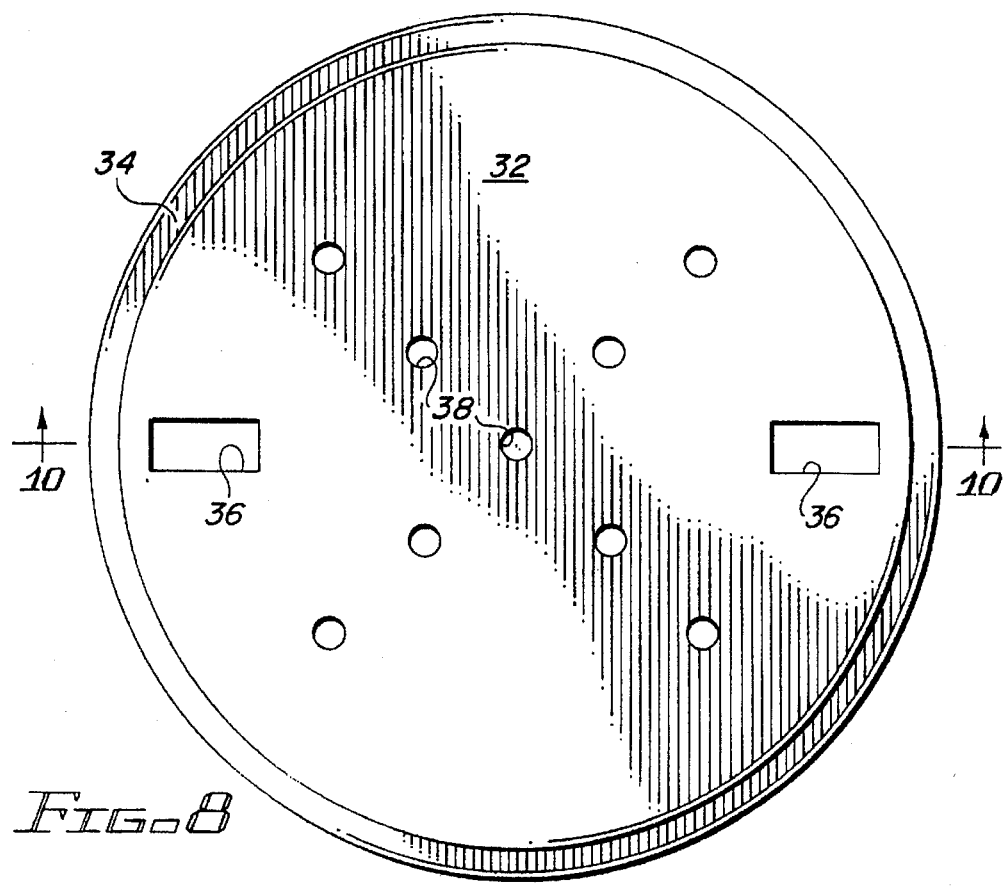
FIG. 8 is a bottom view of another portion of the apparatus shown in FIG. 5.
Figure 9:
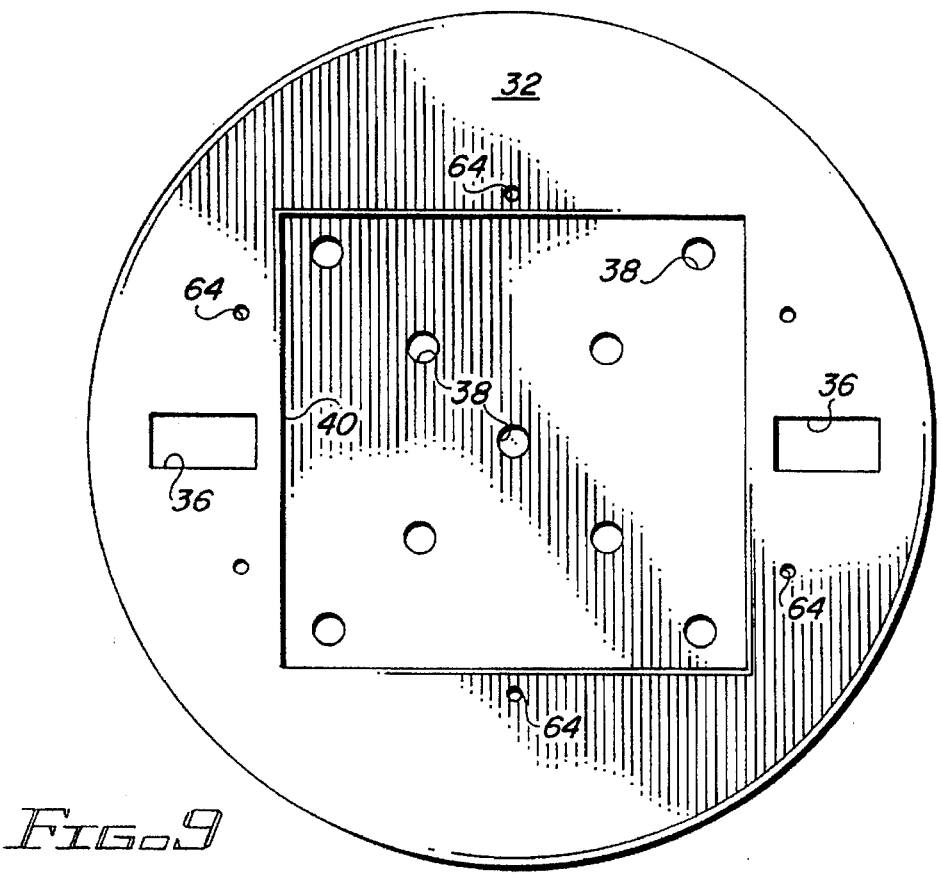
FIG. 9 is a top view of the portion shown in FIG. 8.

The part of the portion 32 of the purge director which is located nearest the circuit board 14, therefore, is in close proximity to the circuit board 14, as is readily apparent from an examination of FIG. 4. The head portion 32, as illustrated most clearly in FIGS. 5, 8 and 9, has a plurality of spaced holes 38 passing through it to direct purge gases applied to the head, through the holes 38, uniformly, over the circuit board 14. FIG. 8 shows the side of the head portion 32 of the purge director which faces the circuit board 14; and FIG. 9 illustrates the opposite (left-hand side as viewed in FIG. 5) of this portion of the purge director. FIG. 10 is an enlarged cross-sectional view of the right-hand portion 32 of the purge director.

The purge director further includes a second part 44 typically made of a suitable molded plastic, as is the portion 32, which fits onto the outer raised part of the portion 32 to form an inner chamber between the part 44 and the part 32, as illustrated most clearly in the cross-sectional view of FIG. 5. The part 44 is shown in cross section in FIG. 7, and in a top view in FIG. 6. It includes a plurality of holes 60, which are aligned with mating holes 64 in the top of the lower portion 32, to permit fasteners such as screws to be used to secure the two parts together in the configuration shown in FIG. 5. As noted most clearly in FIGS. 5 and 7, the central portion of the part 44 includes a raised support section 45 with a cylindrical aperture 46 (of larger diameter than the diameter of the holes 38) formed entirely through the part 44/45.

The portion 32 has a pair of elongated rectangular slots 36 formed in it on opposite sides, as shown in FIGS. 8 and 9; and the part 44 has pairs of upright supports 48 located in it on opposite sides of notches designed to overlie the rectangular apertures 36 of the portion 32. Thus, when the parts 32 and 44 are sandwiched together, as illustrated in FIG. 5, the spaces between the upright supports 48 on each side of the part 44 are aligned with corresponding ones of the slots 36 in the portion 32.

A pair of elongated pivoted hooks 50 and 52 are mounted on opposite sides of the part 44 to pivot through pivots 51 and 53 in the supports 48, as shown most clearly in FIG. 5. Aligned with a center line through the center of the aperture 46 and the space between the upright supports 48 on opposite sides of the part 44 are a pair of spring support posts 47, which may be integrally molded as part of the raised portion 45, or which may be separate posts attached to the device in the positions shown in FIGS. 5 and 6. A pair of coil springs 56 and 58 then are interconnected with the left-hand portion of the hooks 50 and 52, respectively, as shown in FIG. 5, to pull the upper parts of the hooks inwardly toward the center axis of the hole 46 through the part 44. This is readily apparent from an examination of FIG. 5. This in turn causes the right-hand ends of the pivot hooks 50 and 52 (as illustrated in FIG. 5) to pivot outwardly, as illustrated in FIG. 5.

Also as noted in FIG. 5, the right-hand ends of the pivot hooks 50 and 52 have a cam surface on them. Thus, when a purge head of the type shown in FIG. 5 is to be attached into the opening 19 in the load board 18, the purge head is pressed into place to cause the cammed surfaces on the outer edges of the pivot hook latches 50 and 52 to push inwardly against the force of the springs 56 and 58 until the hooks 50 and 52 pass through the opening 19 to the other side, at which time the springs 56 and 58 pull the hooks into the position shown in FIG. 5 to securely latch the purge head into the circular opening 19 in the load board 18.

The purge head is completed by attaching an elongated hollow fitting, comprising a collar 59 and a tapered nipple 62, onto the raised portion 45 of the part 44 This attachment may be made by any suitable means, such as adhesive, threaded fasteners, or the like. The part 59/62 also typically ms made of high impact molded plastic material; but other suitable materials may be used if desired. The nipple 62 has an internal dimension to fit into the end of the resilient delivery hose 28, which is attached to the utilities monument 26 through a purge regulator 29, as illustrated in FIG. 4. A simple slip-fit connection is used since the nitrogen gas delivered through the hose 28 is not delivered under high pressure. Consequently, it is not necessary to secure the hose 28 to the nipple 62 with anything other than the friction of the hose with the nipple 62 itself.

Once the purge director head of FIG. 5 is in place in the test apparatus, as shown in FIG. 4, the desired amount of nitrogen gas or other purging gas supplied from the utilities monument 26 is regulated by the purge regulator 29 to deliver the gas through the aperture 46 into the chamber formed within the raised outer portion of the portion 32 of the purge director. From there, the gas passes outwardly through the holes 38. As illustrated in FIGS. 8 and 9, these holes are located to substantially cover the left-hand side of the circuit board 14 (as viewed in FIG. 4) to evenly direct the nitrogen purge gas over the surface of the circuit board 14. This continually prevents moisture buildup on any part of the circuit board or the contact pins 15, which connect it to the load board 18. If desired, the holes 38, located at increasing distances from the center of the part 32, may be angled outwardly to direct the purge gases toward the outer periphery of the circuit board 14. Such a construction may provide a more uniform gas flow than the axially aligned holes 38 illustrated in FIG. 5. The device configured as illustrated in FIGS. 5 through 10 of the drawings, however, has been found to provide adequate and reliable purging of moisture buildup on the circuit board 14; so that test failures during cold testing of a DUT 16 resulting from moisture buildup are substantially eliminated.

The foregoing description of the preferred embodiment of the invention should be considered as illustrative and not as limiting. Various changes and modifications will occur to those skilled in the art to perform substantially the same function, in substantially the same way, to achieve substantially the same result, without departing from the true scope of the invention as defined in the appended claims.

What is claimed is:

1. Apparatus used with integrated circuit test systems for directing purge gases to a circuit board on which a device under test is mounted while said device is subjected to cold temperatures, with said circuit board mounted on a load board having an aperture therethrough underlying said circuit board, said apparatus including in combination:

a purge head dimensioned to fit said aperture in said load board on a side thereof opposite the side on which said circuit board is mounted, said purge head having at least one hole therethrough for directing purge gases onto said circuit board;

releasable fasteners for releasably securing said purge head in said aperture in said load board; and a hollow connector on said purge head for attachment to a source of purge gases, said connector being coupled with said hole in said purge head to direct purge gases through said hole to said circuit board.

2. The combination according to claim 1 wherein said purge head has a plurality of holes therethrough to direct purge gases onto said circuit board to flow thereover.

3. The combination according to claim 2 wherein at least a portion of said purge head overlies said aperture in said load board on said side thereof opposite the side on which said circuit board is mounted.

4. The combination according to claim 3 wherein said releasable fasteners comprise hook members pivotally mounted on said purge head for engaging said load board at said aperture.

5. The combination according to claim 4 wherein said purge head has openings therethrough and said releasable fasteners extend through said openings in said purge head to releasably engage said aperture in said load board.

6. The combination according to claim 1 wherein a portion of said purge head fits into said aperture in said load board and an additional portion overlies said aperture in said load board on said side thereof opposite the side on which said circuit board is mounted.

7. The combination according to claim 1 wherein at least a portion of said purge head overlies said aperture in said load board on said side thereof opposite the side on which said circuit board is mounted.

8. The combination according to claim 1 wherein said releasable fasteners comprise hook members pivotally mounted on said purge head for engaging said load board at said aperture.

9. The combination according to claim 8 wherein said purge head has openings therethrough and said releasable fasteners extend through said openings in said purge head to releasably engage said aperture in said load board.

\* \* \* \* \*